Figure 1:
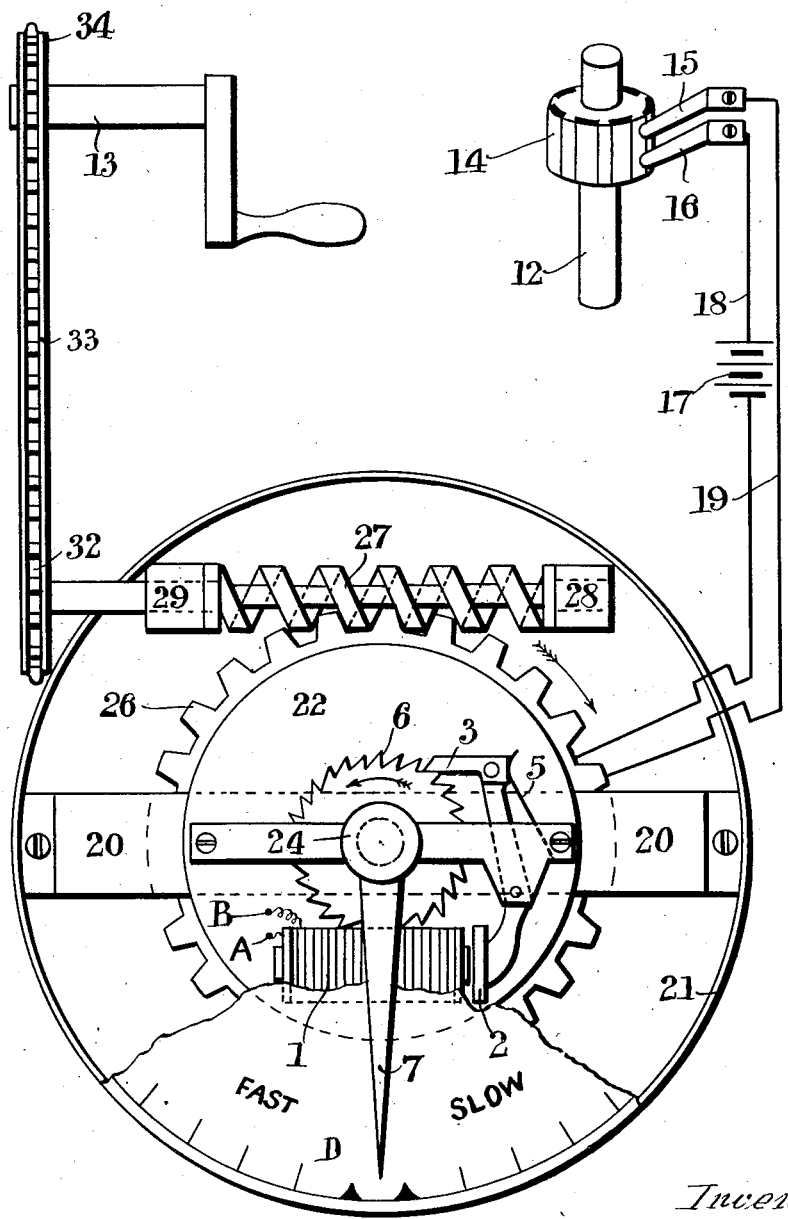

F. A. THOMASSIN.
DEVICE FOR INDICATING VARIATIONS IN SYNCHRONOUS RUNNING OF KINEMATOGRAPHS AND GRAMOPHONES.
APPLICATION FILED APR. 12, 1909.

1,001,091.

Patented Aug. 22, 1911.

2 SHEETS—SHEET 1.

Witnesses:—

Inventor:—
F. A. Thomassin
Attorneys

F. A. THOMASSIN.
DEVICE FOR INDICATING VARIATIONS IN SYNCHRONOUS RUNNING OF KINEMATOGRAPHS
AND GRAMOPHONES.
APPLICATION FILED APR. 12, 1909.

1,001,091.

Patented Aug. 22, 1911.

2 SHEETS—SHEET 2.

UNITED STATES PATENT OFFICE.

FRANCIS ALEXANDER THOMASSIN, OF STREATHAM, ENGLAND.

DEVICE FOR INDICATING VARIATIONS IN SYNCHRONOUS RUNNING OF KINEMATOGRAPHS AND GRAMOPHONES.

1,001,091.   Specification of Letters Patent.   Patented Aug. 22, 1911.

Application filed April 12, 1909. Serial No. 489,385.

*To all whom it may concern:*

Be it known that I, FRANCIS ALEXANDER THOMASSIN, a subject of the King of Great Britain and Ireland, residing at 20 Glen Eagle road, Streatham, Surrey, England, have invented a Device for Indicating Variations in Synchronous Running of Kinematographs and Gramophones, of which the following is a specification.

This invention relates to a new or improved indicating method and device whereby the operator of a kinematograph apparatus is enabled to maintain the movement of such apparatus, at a speed which shall have a constant ratio to the speed of a gramophone or other sound reproducing apparatus moving simultaneously but at a distance from said kinematograph.

The object of my invention is to provide a method and means of so controlling the movements of a single hand, disk, or other suitable indicator, that such movements may correctly represent the variations from synchronism between a kinematograph and gramophone working simultaneously, but independently and at a distance from each other and consequently to enable the operator of either or both of such kinematograph and gramophone to so adjust and maintain the speed of said apparatus that synchronous working of the two may be secured.

By my invention as hereinafter more particularly described I impart a movement electrically controlled by the gramophone to an indicating hand and at the same time I rotate the entire electrical mechanism in a contrary direction to that in which said electrical mechanism is moving the indicating hand. This rotation of the entire electrical mechanism is secured by gearing connected direct to the kinematograph mechanism or it may be produced by means of electrically operated gearing in electrical connection with the kinematograph. It will be apparent that when the gramophone and kinematograph are both moving at the designed relative speeds to each other, the movement imparted to the hand by the gramophone controlled mechanism will be equal to that given to it in a contrary direction by the kinematograph controlled portion of the device and in consequence no movement of the indicating hand will take place. If on the other hand one or other of the two instruments (kinematograph and gramophone) are working too fast or too slow this variation from synchronism will at once be shown by a movement either to the right or left of the central or synchronous point and the amount of such movement will correctly give the number of revolutions necessary to again establish synchronism.

I am aware that the idea of a gramophone and kinematograph electrically or mechanically controlling a hand or hands upon a dial for this purpose is not new but in my invention as herein described I secure a differentiated control of a single hand by an entirely new method and means.

A form of apparatus which may be employed for this invention is illustrated in the accompanying drawings.

Figure 2:
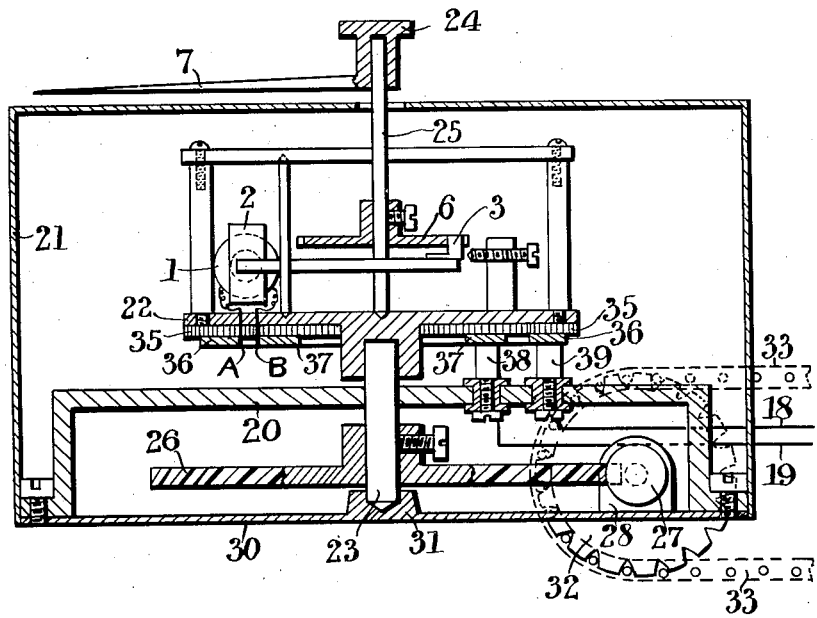
Figure 3:
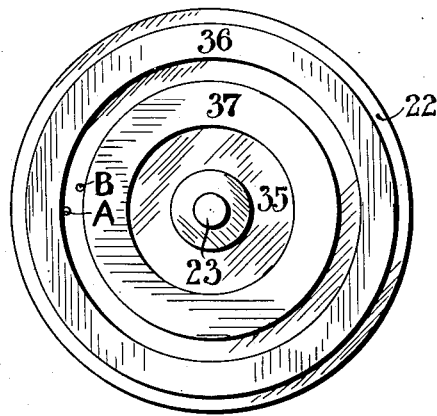

Figure 1 represents a plan of the indicating device and also of the connections to the gramophone and kinematograph of which 12 and 13 on the shafts are represented diagrammatically. Fig. 2 represents vertical section through the device and Fig. 3 represents plan of the moving contact rings employed to keep constant electrical connection between the electrical movement and the gramophone.

I will now proceed to describe the construction of this indicating apparatus by aid of the drawings throughout all of which the same numerals apply to the same parts.

The shaft of the gramophone 12 is fitted with a commutator or multiple contact 14 and when revolving it alternately closes and breaks the electrical circuit between the brushes 15 and 16. Current is supplied to this circuit from the battery 17 and electrical connection between the gramophone and indicator is secured by the wires 18 and 19. The indicator consists of an outer case 21 in which is fitted an electrical escapement movement constructed upon and supported by the rotating disk 22 and its shaft 23. Said electrical escapement when actuated by electricity supplied intermittently—through the movements of the gramophone—imparts a movement to the indicating hand 7. The escapement movement consists of an electromagnet 1 which intermittently attracts the armature 2 and imparts a movement to the wheel 6 through the pawl 3. The spring 5 actuates the pawl directly the armature 2 is released by the electro-magnet 1. The indicating hand 7 is fixed to the split bush 24 and has a frictional fit to the shaft 25 of the escapement wheel 6. The disk 22 which supports the electrical movement is fitted with a shaft 23. Shaft 23 rotates in bearings fitted in the bridge shaped piece 20 and is supported on the end by the bearing 31 on the baseplate 30. To the shaft 23 is rigidly fixed a worm wheel 26 driven by the worm 27. Worm 27 is supported by bearings 28, 29, and at one end of worm 27 is fitted a chain sprocket 32 to which is attached a chain 33 driven by another sprocket 34 fixed to the kinematograph shaft 13.

To the underside of disk 22 is fixed a wide ring of insulating material 35 and upon this insulating ring are fitted two metal rings 36, 37 insulated from each other and also from the disk 22. Ring 36 is electrically connected by wire to one end of the electro-magnet coil 1 and ring 37 is connected in a similar manner to the other end of electro-magnet coil 1. Fitted to the bridge 20 and insulated therefrom are two brushes 38, 39 said brushes individually maintaining a constant contact with the contact rings 37, and 36 respectively. The brushes 38, 39, are directly connected by means of terminals to the line wires 18 and 19. The object of the rings 36 and 37 and the brushes 38 and 39 is to provide a means whereby the electro-magnet 1 may be kept in constant electrical connection with the line wires 18 and 19 although the entire magnet 1 is being rotated with the disk 22 on its axis 23.

Fig. 3 represents the underside of disk 22 and shows the position of the insulating ring 35 with the metal contact rings 36 and 37 attached thereto. A and B are two holes passing through 35 and 22 through which the two ends of the coil 1 are passed before connecting them to the contact rings 36 and 37.

The electrical contact arrangements shown in the drawings and herein described both as regards connection on gramophone shaft and also those for maintaining continuous electric connection between the electro-magnet and the line wires are open to large alteration or modification as the necessity may arise without departing from the scope of this invention.

In certain cases and where it is necessary to use my invention under conditions in which the movements of an indicating hand cannot readily be seen by the operator of the apparatus I may prefer to make the graduated dial of semi-translucent material and illumine same from behind or I may dispense with a hand and dial and employ instead an indicator composed of 2 or more colored disks connected to an arm attached to shaft 25 and operating before an opening in the case 21 of the apparatus and having an illuminant behind them.

The apparatus hereinbefore described works as follows:—The movement of the gramophone shaft 12 automatically transmits intermittent electrical excitation to the electro-magnet, and consequently to the armature 2, the pawl 3, the wheel 6, and the hand 7. This movement will be in direct proportion to the speed of the gramophone and will be in the direction of the arrow shown on wheel 6. The simultaneously revolving kinematograph shaft 13 will at the same time transmit a movement to the worm wheel 26 and shaft 23 by means of the chain 33 and the gearing shown in the drawing. The movement of the shaft 23 thus produced and controlled by the rotation of the kinematograph shaft 13 will be in the direction of the arrow on wheel 26 or in a direction contrary to that imparted to the indicating hand 7 by the rotation of the gramophone shaft 12. It will be apparent that the movement given to the electrical escapement supported by disk 22 and shaft 23 will also be imparted to the indicating needle 7 also in the same direction and at the same speeds. It follows therefore that as the gramophone imparts a motion to the indicator 7 in one direction and the kinematograph actuates the needle 7 in exactly the reverse direction no apparent movement of the indicating hand will take place when the two instruments are working in synchronism but directly synchronous running is broken the amount and direction of such variation will be indicated by the needle upon the suitably graduated dial D. The operator therefore is provided by this invention with a new means of instantly indicating the movements of two independently moving mechanisms and is enabled to maintain the speed of said apparatus such that synchronous running may be continuous.

The indicator described above may be used in the production of synchronized films and records as well as in reproducing said films and records.

What I claim and desire to secure by Letters Patent is:—

1. An apparatus for indicating the synchronous running of a kinematograph and a gramophone, comprising a fixed dial, an indicator revoluble relatively thereto, an electrically operated mechanism electrically connected with the gramophone and mechanically connected with said indicator to rotate it in one direction, a shaft supporting said mechanism and operable to rotate said mechanism, gearing connected to said shaft and to a kinematograph for rotating said electrically operated mechanism in a direction contrary to that in which said mechanism rotates said indicator.

2. In an apparatus for indicating the synchronous operation of kinematographs and talking machines, the combination with an indicating needle, of an electrically operated mechanism having a shaft connected with said needle for rotating it in one direction, means for rotating said electrically operated mechanism in a direction contrary to the direction of rotation imparted by said electrically operated mechanism to said needle, and means operable to maintain a continuous electrical connection with said moving electrically operated mechanism.

In testimony whereof I have affixed my signature, in presence of witnesses.

FRANCIS ALEXANDER THOMASSIN.

Witnesses:
ALFRED NUTTING,
C. P. LIDDON,
CLARENCE PERCY LIDDON.